United States Patent [19]

Desler

[11] Patent Number: 4,718,045

[45] Date of Patent: Jan. 5, 1988

[54] UNDERWATER SEISMIC ENERGY SOURCE

[76] Inventor: James F. Desler, 3303 Redwood Lodge, Kingwood, Tex. 77339

[21] Appl. No.: 451,267

[22] Filed: Dec. 20, 1982

[51] Int. Cl.$^4$ ............................................... G01V 1/38
[52] U.S. Cl. ...................................... 367/24; 181/110; 181/111; 181/115
[58] Field of Search ..................... 367/23, 24, 144, 16, 367/17, 18, 130, 106; 181/110, 111, 115; 114/253, 245

[56] References Cited

U.S. PATENT DOCUMENTS

| | | | |
|---|---|---|---|
| 3,479,638 | 11/1969 | Rusnak | 367/24 |
| 4,038,630 | 7/1977 | Chelminski | 367/23 |
| 4,382,486 | 5/1983 | Ruehle | 367/23 |

Primary Examiner—Thomas H. Tarcza
Assistant Examiner—Ian J. Lobo
Attorney, Agent, or Firm—Bernard A. Reiter; Mark G. Bocchetti

[57] ABSTRACT

Disclosed is an underwater seismic energy source which includes a plurality of airguns. Each of the airguns has substantially the same size, weight and external configuration, but the internal capacities are configured such that when the guns are fired the primary pulses interfere constructively and the bubble pulses interfere destructively. Each of the airguns is connected in the same way to an individual tow line, each having the same length. When the airguns are towed, they are maintain substantially the same depth, even without flotation devices such as Norwegian buoys or rigid floats.

10 Claims, 4 Drawing Figures

UNDERWATER SEISMIC ENERGY SOURCE

BACKGROUND OF THE INVENTION

A. FIELD OF THE INVENTION:

The present invention relates generally to the field of underwater seismic surveying and more particularly to a method and apparatus for maintaining a tuned array of airgun seismic energy sources at a uniform depth below the water's surface without the use of flotation devices.

B. DESCRIPTION OF THE PRIOR ART:

One commonly used source of seismic energy in underwater seismic surveying is the airgun. One airgun is described generally in U.S. Pat. Nos. 3,249,177 and 3,379,273. Airguns of different designs are described in U.S. Pat. Nos. 3,638,752 and 4,285,415.

In general terms, airguns operate by releasing rapidly into the water a charge of high pressure air. Typically, the air is released at a pressure in the order of 2,000 psig over a period of less than one millisecond to less than five milliseconds. However, some air guns operate at pressures as high as 4,500 psig.

The initial release of stored high pressure air into the water produces a primary energy pulse which travels through the water and into the earth. Portions of the energy of the primary pulse are reflected by different earth formations and the reflected energy is recorded through hydrophones.

However, in addition to the primary pulse, the gun also produces a series of secondary or bubble pulses. The bubble pulses occur because the bubble of air produced by the gun oscillates. The bubble pulses have decreasingly smaller amplitudes than the primary pulse, but they tend to obscure or obliterate the primary pulse reflections.

There have been attempts to suppress or eliminate the bubble pulses associated with air guns. One such attempt is known as the wave shape kit technique, which is disclosed in U.S. Pat. No. 3,653,460. The wave shape kit technique involves injecting air into the bubble after the primary pulse thereby to attempt to reduce the magnitude of the implosion of the bubble after the primary pulse. An article entitled "An Efficient Method of Operating the Air-Gun" by M. H. Safar, Volume 28, Geophysical Prospecting, Pages 85–94 (1980), suggests a technique for generating a seismic pulse from the bubble pulses that are radiated by the air gun. The technique is implemented by firing a single air gun several times at the same depth, but with different chamber pressures.

The most common and widely used method for suppressing the energy due to bubble pulses is by the use of what is known as a "tuned array". A tuned array consists of a plurality of airguns that are arranged such that when they are fired the primary pulses interfere constructively and the bubble pulses interfere destructively. The formation of the array involves setting up the individual guns of the array so as to produce bubble pulses of different periods.

One method of forming a tuned array is described in an article entitled "Signature and Amplitude of Linear Air Gun Arrays", by J. J. Nooteboom, Volume 26, Geophysical Prospecting, Pages 194–201 (1978). According to theory developed by United Geophysical Corporation in 1968, the period or "bubble time" can be determined by the following equation:

$$T_b = c\rho\omega^{\frac{1}{3}} \frac{P^{\frac{1}{3}}V^{\frac{1}{3}}}{P_s^{5/6}}$$

Where
$T_b$ equals bubble time
$P^w$ equals density of water
$P$ equals compressed air pressure
$V$ equals compressed air volume
$P_s$ equals static water pressure
$C$ equals constant depending on gun design.

Since static water pressure is a linear function of depth $$P_s = P_w(D+K)$$

(where k is a constant dependent on atmospheric pressure) bubble time may be expressed in terms of depth as follows:

$$T_b = C \frac{P^{\frac{1}{3}}V^{\frac{1}{3}}}{\rho\omega^{\frac{1}{3}}(D+k)^{5/6}}$$

Assuming that the compressed air pressure and depth of the guns in the array are constant, then the bubble time of each gun of the array is proportional to the cube root of the volume of the respective gun $$T_b \alpha V^{\frac{1}{3}}$$

Again, according to theory, which is verified by experiment, the peak amplitude of the pressure wave is also proportional to the cube root of the volume, $$A \alpha V^{\frac{1}{3}}$$

Combining the above two relations shows that the amplitude is proportional to bubble time. Given the foregoing and the fact that the width of the bubble is proportional to bubble time squared, one can select the air volumes of the individual guns so as to form a tuned array. Of course, it will be recognized that volume may be maintained constant and pressure varied or both pressure and volume may be varied in order to form a tuned array.

Preferably, the guns of the tuned array are spaced apart so as to be non-interacting, which means that the guns and their respective bubbles are not substantially affected by the pressure fields of nearby guns. The reason that non-interacting arrays are preferred, follows from the fact that the amplitude is proportional to the cube root of the gun volume. When bubbles from multiple airguns coalesce, the amplitude increases only as the cube root of the sum of their volumes. However, when the air gun spacing is sufficiently great that the guns are substantially non-interacting, their amplitudes are directly additive. Accordin to Nooteboom, the distance necessary to prevent substantial interaction between two guns of Volumes $V_1$ and $V_2$ may be expressed as $$D = 5.1 \left(\frac{P_1 V_1}{P_s}\right)^{\frac{1}{3}}$$

where
$D$ equals distance between guns
$P_1$ equals air pressure $P_5$ equals static water pressure $V_1$ equals volume of the bigger gun.

However, a paper entitled "Desired Seismic Characteristics of an Air Gun Source" presented at the 48th Annual Meeting of the Society of Exploration Geophysicists in San Francisco, Calif, Oct. 29–Nov. 2, 1978, discloses a tuned array formed with interacting airguns.

From the foregoing, it is clear that in order for the array to be properly tuned, the air guns must be maintained at a uniform depth below the water's surface. Commonly, flotation devices are used to maintain such depth. The flotation devices may be Norwegian buoys or rigid floats. Examples of tuned arrays are disclosed in U.S. Pat. Nos. 3,602,878 and 3,893,559.

There are a number of disadvantages to using flotation devices. For example, the use of rigid floats necessitates a large stern area for the survey vessel and, since a number of guns are hung below the float, that number of guns must be turned off and brought aboard if just one gun fails. Depending on the deploying system, the use of Norwegian buoys may also necessitate the turning off of a number of air guns when one needs to be brought aboard to be repaired.

The interconnected floats, airguns, cables, air lines and electrical lines tend to become snarled and tangled, and are awkward to handle in use and are heavy and very difficult to hoist onboard the vessel when not in use and are difficult to launch into the water in unsnarled condition. Because of the awkwardness and difficulties of handling such complex arrays of equipment at sea under often times difficult conditions, snarl ups and breakages are inevitable.

In U.S. Pat. No. 4,038,630, there is disclosed an air gun marine seismic survey streamer. The streamer includes a plurality of air guns arranged end to end to form an array. The buoyancy of the streamer is controllable so as to maintain the streamer at substantially uniform depth. Each air gun has a generally cylindrical configuration and is of the same diameter, same length and same weight, but its firing chamber volume can be changed and preset to various sizes as may be described by the user. The streamer may be towed directly from a survey vessel without the use of buoys or the like. The buoyance compensating mechanism makes the streamer of the U.S. Pat. No. 4,038,630 complicated.

It is therefore an object of the present invention to provide a tuned underwater seismic energy source array that overcomes the shortcomings of the prior art. More specifically, it is an object of the present invention to provide a tuned underwater seismic energy source array that does not include floats, buoys or buoyancy compensating means.

SUMMARY OF THE INVENTION

Briefly stated, the foregoing and other objectives are accomplished in the present invention by providing a tuned array wherein all of the guns are of the same weight, size, and exterior configuration and each gun is towed by and attached in the same way to an individual tow line, wherein all of the tow lines are of substantially the same length. Since each gun is of the same size, weight, and exterior configuration, each gun produces substantially the same drag as it is towed through the water at a particular speed. Since all of the tow lines are of the same length, when the airguns are towed at a uniform speed, as when they are all connected to the same vessel, all airguns will maintain substantially equal depth.

Each airgun includes, generally, two parts: the gun which contains the ports and firing mechanism, and the firing chamber which holds the compressed air charge. In the present invention, the gun portion of each airgun is substantially identical. The exterior configuration and weight of the firing chamber of each airgun is also substantially identical. However, the interiors of the firing chambers are of different effective volumes. The different effective volumes are achieved in each firing chamber by positioning therein an imperforate barrier.

DESCRIPTION OF THE PREFERRED EMBODIMENT

Figure 1:
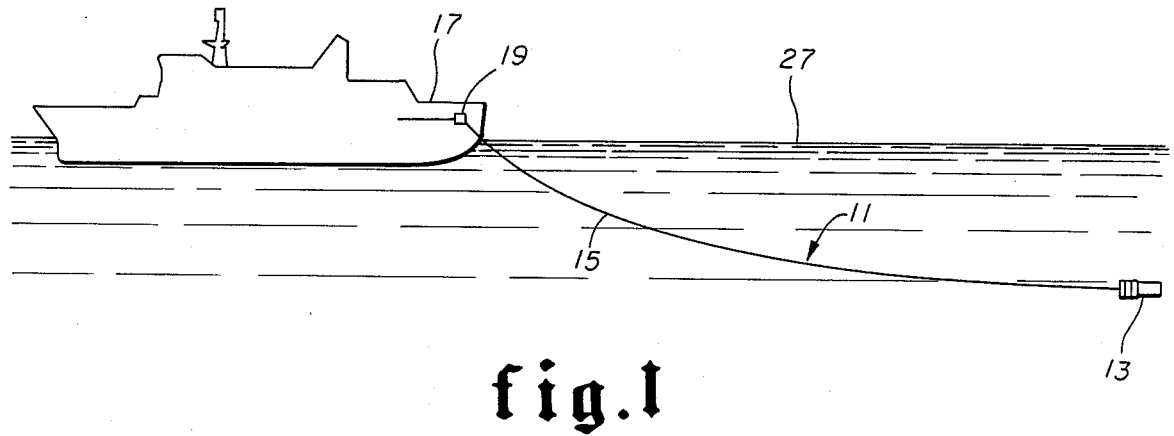
FIG. 1 is a representation of a survey vessel with the seismic energy source of the present invention employed.
Figure 2:
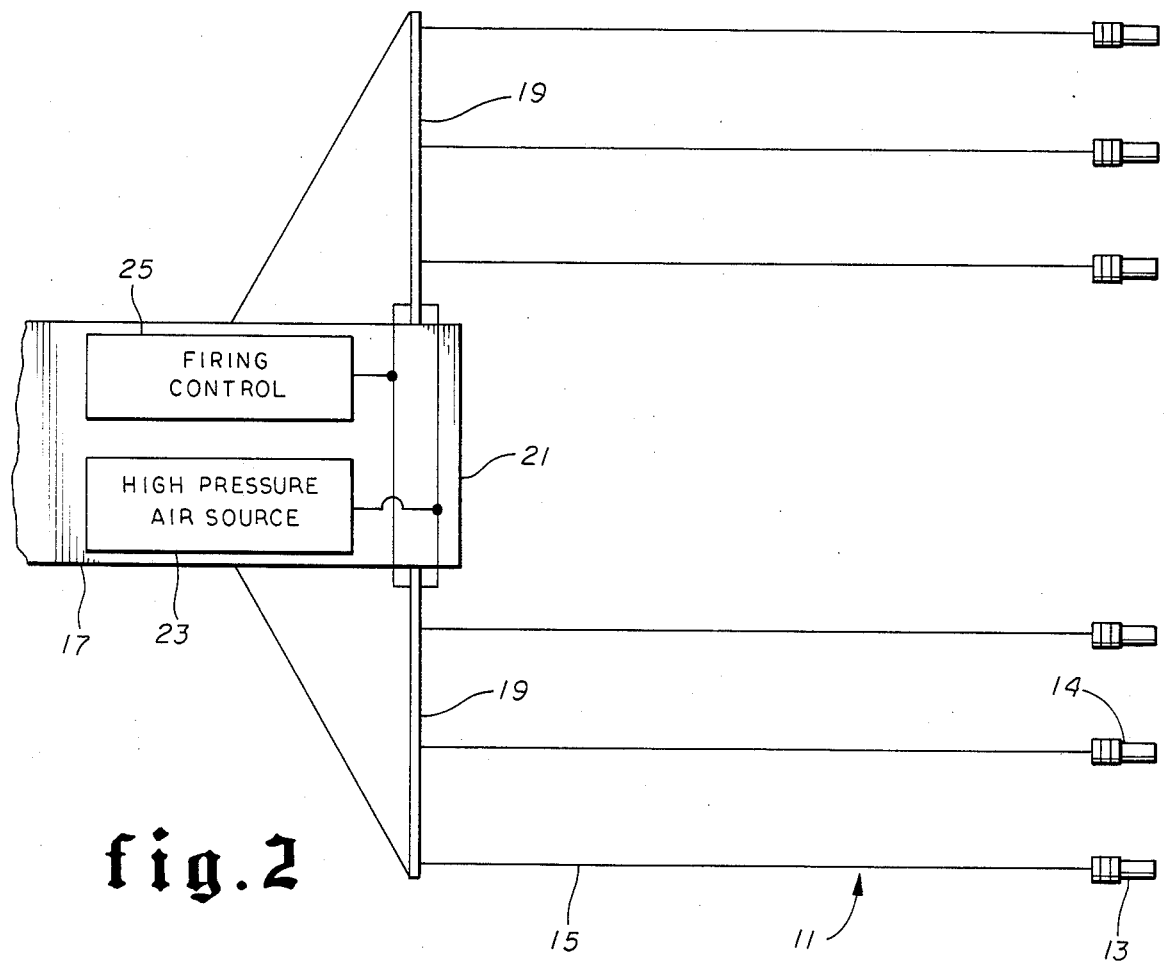
FIG. 2 is a partial top view of the seismic energy source of the present invention.

Referring now to FIGS. 1 and 2, the seismic source of the present invention is designated generally by the numeral 11. Seismic source 11 includes a plurality of airguns, including airgun 13. All of the airguns, including airgun 13, of seismic source 11 are of substantially the same size, weight and exterior configuration. Seismic source 11 also includes a plurality of tow lines, including tow line 15. All of the tow lines are of substantially the same length and are attached to a survey vessel in the preferred embodiment by means of booms, including a boom 19. It will be recognized, of course, that the tow lines may be attached to survey vessel 17 other than by booms. For example, the tow lines could be attached directly to the stern 21 of vessel 17.

Figure 3:
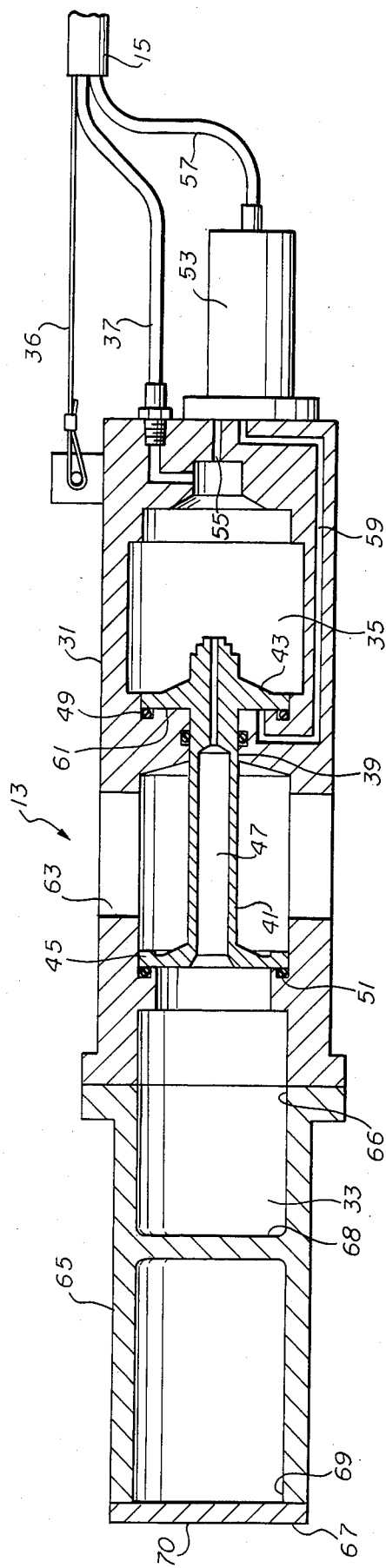
FIG. 3 is a section view of a perferred airgun of the present invention.
Figure 4:
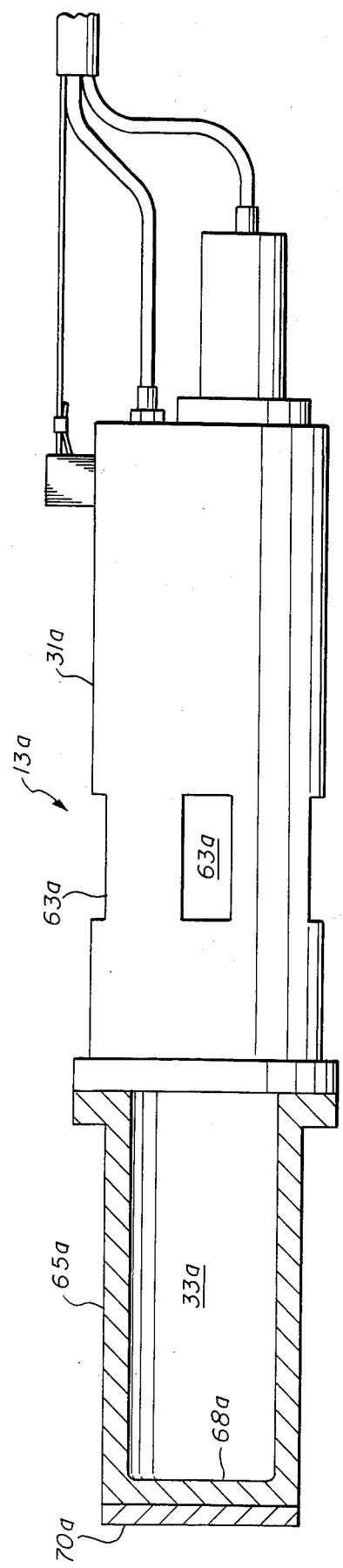
FIG. 4 is a partial sectional view of a preferred airgun of the present invention.

As best shown in FIGS. 3 and 4, the tow lines, including tow line 15, are preferably composite structures including a high tensile strength cable 36, at least one air line 37, and electrical lines 57. The air lines conduct high pressure air from a high pressure air source 23 located on survey vessel 17 to the airguns. The electric lines conduct firing control signals to the airguns from a firing control device 25 located on vessel 17. As will be described in greater detail hereinafter, the airguns, including airgun 13, store high pressure air, which is periodically released upon the receipt at the airgun of the signal from firing control 25.

Since each airgun, including airgun 13, is of substantially the same size, weight and external configuration, all of the airguns produce equal drag when towed through the water in the same way at equal speed. If airgun 13 is towed at a constant speed by a cable 15 of a particular length, airgun 13 will maintain a substantially constant depth below the water surface 27, which depth will occur when the vector sum of the drag, gravity and tow line tension forces is equal to zero. It will be understood that for constant length of tow line 15 and size, weight and external configuration of airgun 13, the faster the speed of vessel 17, the shallower the equilibrium depth of gun 13. It will also be recognized that for constant vessel speed and gun size, weight and external configuration, the longer the length of tow line 15, the deeper will be the equilibrium depth of gun 13. Thus, given constant gun size, weight and external configuration, vessel speed and/or tow line length may be adjusted to control the depth of gun 13. It will also be recognized that when all of the guns are of substantially equal size, weight and external configuration, and all of the tow lines are connected to the guns in substantially the same way and are of the same length, all of the guns will maintain substantially equal depth.

With the airguns maintained at a uniform depth, it is possible by using known techniques, as for example the technique described by Nooteboom in "Signature and Amplitude of Linear Airgun Arrays", 26 Geophysical Prospecting 194–201 (1978), to calculate the gun firing chamber volumes necessary to "tune" the array thereby to increase the amplitude of the primary pulse of the array and suppress the bubble pulses of the individual guns of the array. In the preferred embodiment, high pressure air source 23 is adapted to supply substantially equal pressure to each gun and firing control device 25 is adapted to fire all guns substantially simultaneously. Also, in the preferred embodiment, the guns, as for example gun 13 and gun 14, are spaced horizontally apart a distance sufficient to prevent interaction. The minimum horizontal spacing might be determined according to Equation 6 of the Nooteboom article, which is set forth above.

It will, of course, be recognized that the seismic source of the present invention could be configured to be interacting in the manner set forth in the paper entitled "Desired Seismic Characteristics of an Airgun Source", which was presented at the 48th Annual Meeting of the Society of Exploration Geophysicists in San Francisco, Calif., Oct. 29–Nov. 2, 1978. Those skilled in the art will also recognize that firing control device 25 may be adapted to fire the guns at different time in order to focus the energy in different directions. It will further be recognized that the firing chamber volumes may be maintained constant throughout the array, but that pressure supplied to the individual guns by high pressure source 23 may be varied, as long as depth is maintained uniform, according to the present invention. Furthermore, both firing chamber volumes and air pressure of the individual guns may be varied to form an array which is tuned so long as the guns of the array are maintained at a uniform depth. It will also be recognized that while a six gun array is illustrated, arrays of greater or fewer numbers of guns may be constructed by those skilled in the art, given the benefit of this disclosure. It will also be recognized that while only a single array is disclosed, arrays of multiple sub-arrays may be constructed and used. For example, an additional number of guns having tow lines of uniform length greater than or less than that of tow line 15 may be interspersed with the guns illustrated. If the additional tow lines are of different length than that of tow line 15, the additional guns may be maintained at a different depth from that of airgun 15. However, if the additional guns form a tuned subarray, the combination of the tuned sub-arrays will comprise a tuned array.

Referring now to FIGS. 3 and 4, and first to FIG. 3, there is illustrated a preferred embodiment of the airgun 13 of the present invention. Airgun 13 includes a gun portion 31 and a firing chamber 33. Gun portion 31 includes a control chamber 35, which is supplied with high pressure air by an air line 37, which forms a part of tow line 15. The central part of gun portion 31 is formed to define a bushing 39. Bushing 39 is adapted to receive slidingly sealingly therein a shuttle 41. Shuttle 41 includes a control piston 43 and a firing piston 45. Shuttle 41 includes a central bore 47 which communicates high pressure air between control chamber 35 and firing chamber 33.

Gun portion 31 includes a control piston seal 49 and a firing piston seal 51. Control piston 43 has a larger effective area than firing piston 45. Thus, when control piston 43 and firing piston 45 are seated on seals 49 and 51 respectively, and the pressures within control chamber 35 and firing chamber 33 are substantially equal, shuttle 41 will remain in the position shown in FIG. 3 indefinitely.

Airgun 13 is fired by the operation of a normally closed solenoid valve 53. One preferred solenoid valve is disclosed in U.S. Pat. No. 3,588,039. Gun portion 31 is formed to include an outlet port 55 in control chamber 35, which is normally closed by solenoid valve 53. When it is desired to fire gun 13, solenoid valve 53 is actuated to open by a signal through electric line 57 which forms a part of tow line 15. When solenoid valve 53 opens, air flows through a passage 59 to the back side 61 of control piston 43, thereby reducing the effective area of control piston 43, whereupon shuttle 41 accelerates rapidly toward the right. Gun portion 31 includes a plurality of exhaust ports 63 which are normally isolated from firing chamber 33 by firing piston 45. When gun 13 is fired, exhaust ports 63 are opened abruptly to release the charge of high pressure air. The construction and operation of a preferred embodiment of the gun portion of the airgun of the present invention is detailed exhaustively in U.S. Pat. No. 3,379,273. Those skilled in the art will recognize, however, that the airgun of U.S. Pat. No. 3,379,273 is only the preferred embodiment and that there are a number of other airguns within the scope and spirit of the present invention.

Firing chamber 33 is defined by a cylindrical member 65. Cylindrical member 65 has an open end 66 which is adapted for connection with gun portion 31 and a closed end 67. Tubular portion 65 also includes an imperforate barrier 68, which defines the volumetric capacity of firing chamber 33. In the preferred embodiment, cylindrical member 65 is formed by boring a piece of stock from both ends to form open end 66 and a second end 69 with barrier 68 therebetween. Closed end 67 is formed by welding a plate 70 to second end 69.

Referring now to FIG. 4, there is illustrated an airgun 13a, which includes a gun portion 31a and a cylindrical member 65a. Gun portion 31a is substantially identical to gun portion 31 and the weight and external size and shape of cylindrical member 65a are substantially identical to those of cylindrical member 65. However, imperforate barrier 68a is formed such that firing chamber 33a is of maximum volume. A plate 70a is welded to the end of cylindrical member 65a. Thus, while the volumetric capacity of firing chamber 33a is greater than that of firing chamber 33, cylindrical member 65a is externally substantially identical to tubular member 65. Barrier 68 may be positioned at any point within tubular member 65 thereby to vary the volumetric capacity of the firing chamber. By varying the position of barrier 68, the tuned array of the present invention may be formed.

What is claimed:

1. A method of generating underwater seismic impulses in which the primary pulses interfere constructively with one another and the bubble pulses interfere destructively with one another, which comprises the steps of:

positioning a plurality of airguns in laterally and linearly spaced apart locations, each of said airguns having substantially the same size, weight and external configuration;

connecting each of said airguns to an individual tow line, each of said tow lines having substantially equal length and extending rearward from the stern of a moving vessel such that said tow lines are substantially parallel;

towing said tow lines through the water at a predetermined speed, thereby to maintain all of said airguns at the same depth;

and firing the airguns.

2. The method as claimed in claim 1, including the step of forming each of said airguns to include a firing chamber having an internal capacity such that when said airguns are fired, the primary pulses interfere constructively and the bubble pulses interfere destructively.

3. The method as claimed in claim 1, wherein said fluid is supplied to each of said airguns at substantially equal pressure.

4. The method as claimed in claim 1, wherein said airguns are fired substantially simultaneously.

5. A method of employing a plurality of airguns, each of said airguns having substantially the same size, weight and external configuration and internal capacities such that when the airguns are fired the primary pulses interfere constructively and the bubble pulses interfere destructively, to generate an underwater seismic impulse, which comprises the steps of:

connecting each of said airguns to an individual tow line;

deploying said tow lines with said airguns connected thereto astern of a moving vessel with the towed length of each of said tow lines being substantially equal;

supplying air to each of said airguns;

and firing said airguns.

6. The method as claimed in claim 5, wherein said air is supplied at substantially equal pressure.

7. The method as claimed in claim 5, wherein said airguns are fired substantially simultaneously.

8. The method as claimed in claim 5, including the step of spacing said airguns horizontally apart so as to be non-interacting.

9. A method of maintaining a plurality of acoustic generators in an array at substantially the same depth so that when such acoustic generators are properly spaced apart from one another, the primary pulses interfere constructively with one another and the bubble pulses interfere destructively with one another comprising:

configuring each acoustic generator of an array to be substantially externally identical to every other acoustic generator so that they are substantially the same size, shape and weight;

forming said array in a single line laterally deployed; and towing each acoustic generator on an individual tow line, each of said tow lines being substantially equal in length.

10. The method for generating underwater seismic impulses in which the primary pulses interfere constructively with one another and the bubble pulses interfere destructively with one another which comprises the steps of:

positioning a first plurality of airguns laterally spaced apart from one another, each of said airguns having essentially the same size, weight and external configuration;

connecting an individual tow line to each of said airguns at a distal end and connecting a proximal end of each of said tow lines to a towing vessel, each of said tow lines having substantially the same length and constituting a first sub-array of airguns;

supplying fluid to each of said airguns in order to cause the operation thereof as a first sub-array;

positioning a second plurality of airguns in laterally spaced apart locations in a colinear relationship with respect to the first sub-array, each of said second plurality of airguns having substantially the same size, weight and external configuration;

connecting an individual tow line at a distal end to one of said airguns and at a proximal to the towing vessel, all of said tow lines having substantially the same length and thus constituting a second sub-array of airguns;

supplying fluid to said second plurality of airguns so as to form a second operating sub-array;

towing all of said tow lines and airguns through the water at a predetermined speed to thereby maintain all of said airguns of each sub-array at the same depth;

and firing the airguns.

* * * * *